United States Patent [19]

Hardy

[11] 4,441,019

[45] Apr. 3, 1984

[54] WAVEFRONT SENSOR WITH ASTIGMATIC OPTICS

[75] Inventor: John W. Hardy, Lexington, Mass.

[73] Assignee: Itek Corporation, Lexington, Mass.

[21] Appl. No.: 343,653

[22] Filed: Jan. 28, 1982

[51] Int. Cl.³ .............................................. G01J 1/20
[52] U.S. Cl. .................................. 250/201; 250/237 R
[58] Field of Search .......... 250/201, 204, 216, 237 R, 250/237 G, 578, 203 R; 372/95, 99

[56] References Cited

U.S. PATENT DOCUMENTS

| | | | |
|---|---|---|---|
| 3,586,665 | 6/1971 | Weyrauch | 250/231 |
| 3,832,066 | 8/1974 | Cornsweet | 356/127 |
| 3,923,400 | 12/1975 | Hardy | 356/107 |
| 4,079,247 | 3/1978 | Bricot et al. | 250/204 |
| 4,091,274 | 5/1978 | Angelbeck et al. | 250/201 |

Primary Examiner—David C. Nelms
Attorney, Agent, or Firm—Homer O. Blair; Robert L. Nathans; Gerald H. Glanzman

[57] ABSTRACT

A relatively simple wavefront sensor is constructed with an astigmatic optical system which focuses an indicent wavefront to x and y focal planes, with the x and y focal planes being relatively displaced along the optical axis because of the astigmatic nature of the optical system. An x modulation reticle is positioned at the x focal plane, and an x drive tuning fork drives the x modulation reticle in linear oscillation at a frequency $f_x$ to modulate the wavefront thereat. A y modulation reticle is positioned at the y focal plane, and a y drive tuning fork drives the y modulation reticle in oscillation, substantially perpendicular to the direction of oscillation of the x modulation reticle, at a frequency $f_y$, different from the frequency $f_x$, to also modulate the wavefront thereat. A detector array then receives the modulated wavefront, with each detector in the array receiving and detecting a different zone of the incident wavefront. An x electrical filter is coupled to the output of each detector, tuned to the frequency $f_x$, to filter out the modulated signal derived from modulation by the x modulation reticle, and a y electrical filter is also coupled to the output of each detector, tuned to the frequency $f_y$, to filter out the modulated signal derived from modulation by said y modulation reticle. The arrangement is such that the time relationships between the signals produced by the detectors in the array ar representative of the slopes of different portions of the wavefront.

7 Claims, 6 Drawing Figures

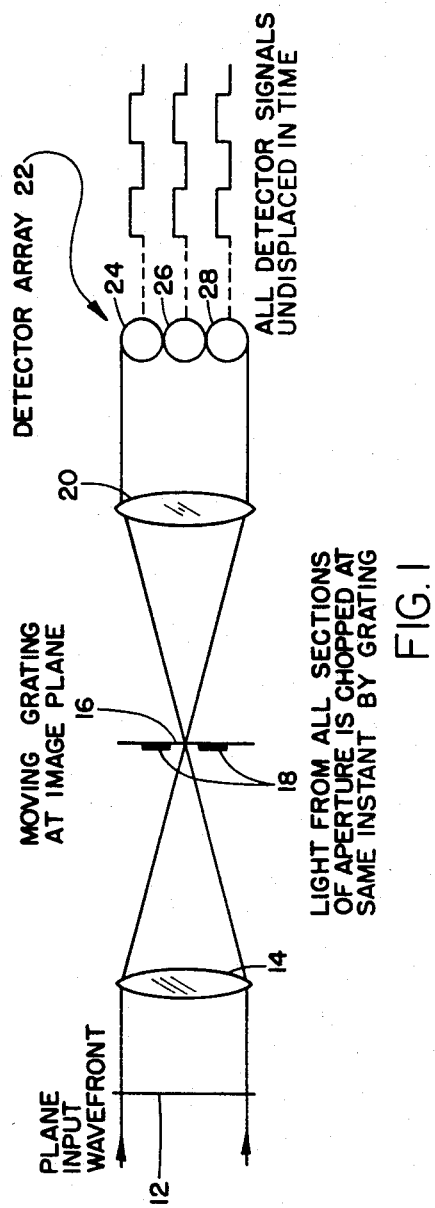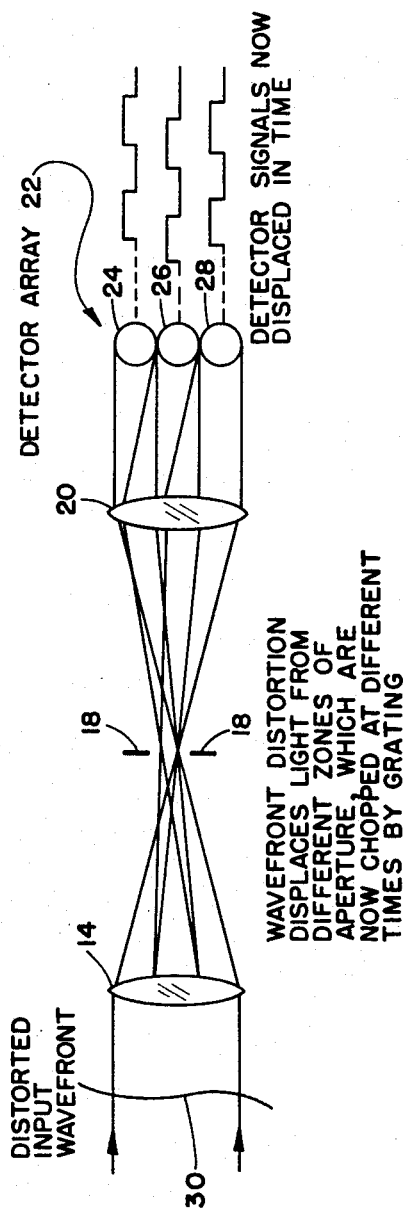

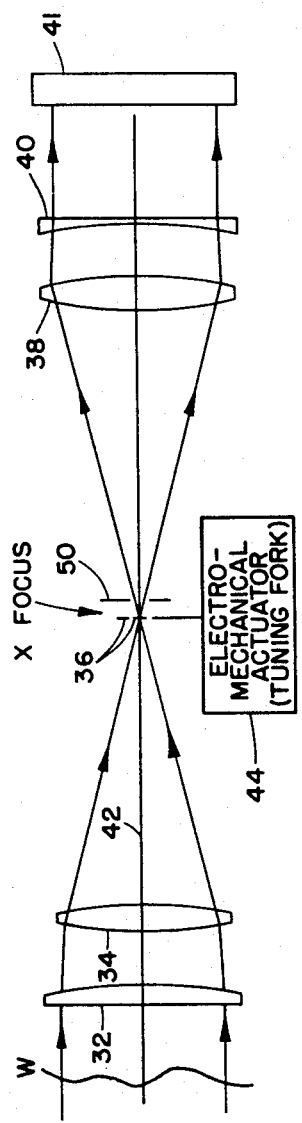
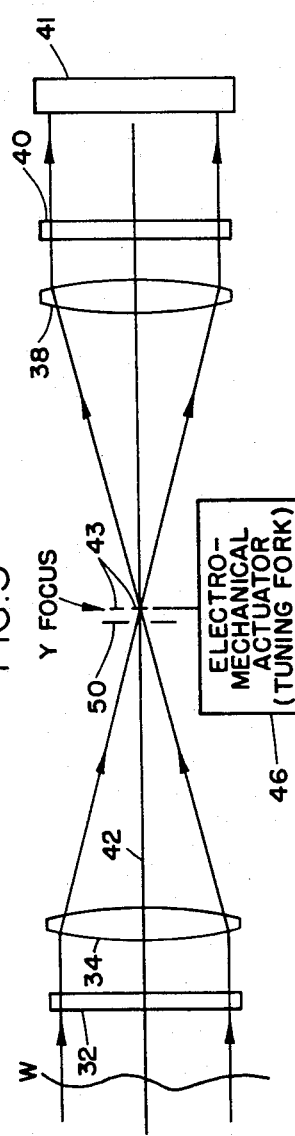
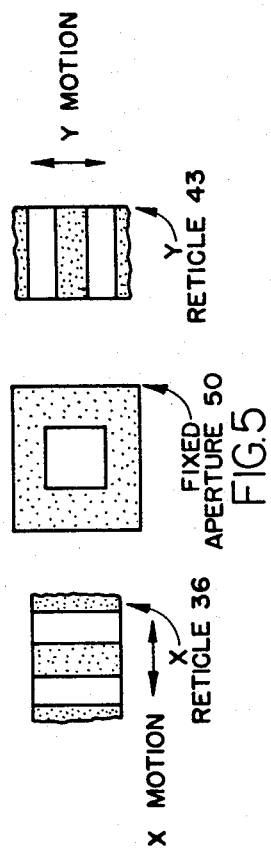

WAVEFRONT SENSOR WITH ASTIGMATIC OPTICS

BACKGROUND OF THE INVENTION

1. Field of the Invention

The present invention relates generally to a wavefront sensor for detecting wavefront tilts along two orthogonal directions, and more particularly pertains to a simple, white light wavefront sensor of the aforementioned type which is particularly suitable for a real-time solar image compensation system.

The field of active optics technology can be applied to high performance optical systems which encounter or are subject to random disturbances such as vibration, thermal transients or atmospheric turbulence. Active optics technology can be applied to laser beam control systems and compensated imaging systems. For instance, concerning the latter types of systems, the resolution of ground based optical imaging system is frequently severely limited by random wavefront tilts and phase changes produced by atmospheric turbulence. The resolution of such optical systems can usually be improved considerably if the atmospheric distortion is measured and corrected in real-time before recording the image on tape or film.

2. Discussion of the Prior Art

Hardy U.S. Pat. No. 3,923,400 discloses a real time wavefront correction system of the type discussed above in which real time phase distortions in a wavefront being imaged by an optical system are detected and substantially eliminated prior to recordation of the wavefront. The Hardy wavefront correction system utilizes an AC, lateral shearing interferometer to measure in real time the relative phase differences of the wavefront. The measured phase differences are directed to an analog data processor which generates a plurality of electrical signals proportional to the required corrections at different areas of the wavefront. The electrical signals are applied to a phase corrector upon which the wavefront is incident to change the relative phase at various locations of the wavefront to achieve a wavefront in which the phase distortion is removed. The phase correction device can for instance consist of a mirror having an array of piezoelectric elements which function to selectively deform the mirror to correct phase distortions in the wavefront.

A similar type of active optics system has also been applied to an optical system for solar observations, and employs a rotating radial or Ronchi grating to detect wavefront tilts. In this prior art arrangement an array of photodetectors positioned at the conjugate image of a deformable mirror detect signals modulated by the rotating radial grating. The phase of the electrical signal at each detector is directly related to the wavefront slope at the conjugate image of the deformable mirror, and is utilized to selectively control the mirror surface in a feedback loop to null the errors. A drawback of this system is the use of relatively complex hardware having a mechanically rotating grating to modulate the wavefront prior to detection. A wavefront sensor having a mechanically rotated grating is undesirable in many system applications, such as space systems and equipment requiring a compact size and a substantial tolerance to shocks and vibrations. Moreover, to operate with an extended reference object such as the sun, a system of this type also requires the location of a precisely adjustable field stop in the image plane at which the rotating grating is positioned, which results in complications of both the optical and mechanical systems.

SUMMARY OF THE INVENTION

Accordingly, it is a primary object of the present invention to provide an improved incremental slope wavefront sensor having a relatively simple and rugged design.

A further object of the subject invention is the provision of an incremental slope wavefront sensor capable of operation at kilohertz frequencies and above which does not require a mechanically rotating grating. However, the wavefront sensor of the present invention does modulate or chop the light of the wavefront to eliminate errors caused by detector nonlinearity and nonuniformity, thereby resulting in a high performance detection system.

Incremental slope wavefront sensors within the teachings of the present invention have many advantageous characteristics. They can operate in either monochromatic or white light, and also are capable of operation with extended, incoherent sources of radiation. Optical path differences are measured independent of the wavelength of the source, and the performance is independent of the aperture size of the optical system. Finally, a local optical reference beam is not required, as in many prior art wavefront sensors such as the aforementioned Hardy system.

The present invention has additional advantages over many prior art wavefront sensing arrangements. The requirement is eliminated for a beam splitter and separate optical detectors to sense the slope of the wavefront along orthogonal x and y directions, thereby allowing only a single detector array to sense the slope of the two-dimensional wavefront. Moreover, the arrangement of the present invention allows the utilization of separate electromechanical modulator drives, such as tuning forks or torsional vibrators.

The disclosed embodiments of the present invention were designed specifically for use with a wavefront emanating from a very bright source having fine surface detail, such as the granulation pattern of the sun, and is particularly suitable for a real time solar image compensation system. The complexity of the system has been minimized by taking advantage of the following characteristics of this operational environment. The wavefront sensor is not required to be photon-limited, and accordingly its optical efficiency can be traded off to obtain a simple implementation. The image structure is well defined and reasonably constant, and accordingly adaptive features such as variable shear are not required. There is no induced wind velocity caused by image motion, which allows the measurement time to be several milliseconds.

In accordance with the teachings of the present invention, a relatively simple wavefront sensor is constructed with an astigmatic optical system which focuses an incident wavefront to x and y focal planes, with the x and y focal planes being relatively displaced along the optical axis because of the astigmatic nature of the optical system.

An x modulation reticle is positioned at the x focal plane, and an x drive means drives the x modulation reticle in linear oscillation at a frequency $f_x$ to modulate the wavefront at the x focal plane. A y modulation reticle is positioned at the y focal plane, and a y drive means drives the y modulation reticle in oscillation, substantially perpendicular to the direction of oscillation of the x modulation reticle, at a frequency $f_y$ to also modulate the wavefront at the y focal plane.

A detector array is positioned to receive the wavefront after it has been modulated at the x and y focal planes, with each detector in the array receiving and detecting a different zone of the incident wavefront such that the time relationships between the signals produced by the detectors in the array are representative of the slope of different portions of the wavefront.

The frequency $f_y$ is different from the frequency $f_x$, and an x electrical filter is coupled to the output of each detector, tuned to the frequency $f_x$, to filter out the modulated signal derived from modulation by the x modulation reticle, and a y electrical filter is also coupled to the output of each detector, tuned to the frequency $f_y$, to filter out the modulated signal derived from modulation by said y modulation reticle.

In one disclosed embodiment of the present invention, both the x and the y modulation reticles are formed by a series of light transmissive and light opaque reticle lines arranged in a square wave function, and the x and y reticle drives comprise electrically driven tuning forks.

BRIEF DESCRIPTION OF THE DRAWINGS

The foregoing objects and advantages of the present invention for a wavefront sensor may be more readily understood by one skilled in the art with reference being had to the following detailed description of several preferred embodiments thereof, taken in conjunction with the accompanying drawings wherein:

FIGS. 1 and 2 are relatively simple optical diagrams illustrating the principles of operation of the present invention;

FIGS. 3 and 4 are respectively plan and elevational views (from orthogonally displaced directions) of one embodiment of an improved wavefront sensor having an astigmatic optical system;

FIG. 5 illustrates the x and y modulation reticles and the fixed aperture employed in the wavefront sensor of FIGS. 3 and 4.

DETAILED DESCRIPTION OF THE DRAWINGS

Figure 6:
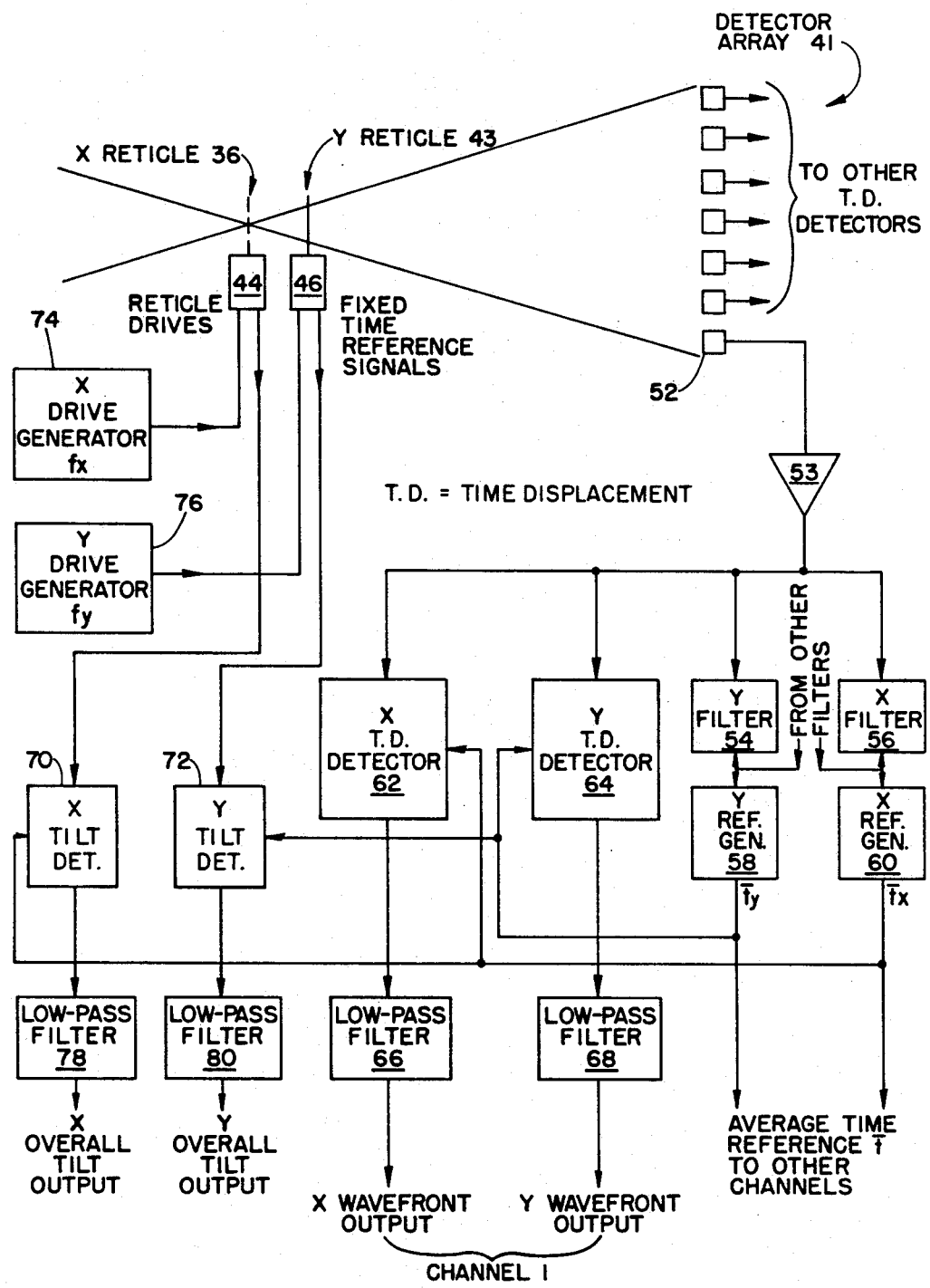
FIG. 6 is a block diagram of a circuit for processing the output signals of the wavefront sensor, and illustrates in detail one of the multiple processing channels required thereby.

Referring to the drawings in detail, FIGS. 1 and 2 illustrate the general principles of operation of the wavefront sensor of the present invention. FIG. 1 shows a plane, undeformed wavefront 12 which is incident upon a spherical objective lens 14 which focuses the wavefront at its focal plane 16. A linearly oscillating grating 18 is positioned in the focal plane 16, and can be simply one or more cycles of a square wave function having adjacent transmissive and opaque grating lines. Since the incident wavefront is plane and undeformed, all portions thereof are focused to a focal point at the moving grating at the same location, and the wavefront is uniformly modulated or chopped thereby. The wavefront then expands until it is incident upon a second spherical objective lens 20 which collimates the wavefront and directs it onto a detector array 22, shown schematically as having three photodetectors 24, 26 and 28. Each detector in the array produces a square wave output in coincidence with the modulation by the moving grating, and the output signals of all of the detectors 24, 26 and 28 are in phase with each other.

FIG. 2 illustrates the response of the same wavefront sensor to a distorted input wavefront 30. The wavefront distortion displaces the position of the image of the reference source produced by each portion of the wavefront focused by spherical objective 14 onto the moving grating 18, and this displacement causes different portions of the wavefront to be modulated or chopped at different times by the moving grating 18. The detectors 24, 26 and 28 are each responsive to a different portion of the incident wavefront, with photodetector 24 sensing primarily the bottom third of the incident wavefront, detector 26 responding primarily to the middle third of the incident wavefront, and photodetector 28 sensing primarily the upper third of the incident wavefront, as shown. The photodetectors now produce output signals which are displaced in time and phase relative to each other, with the phase displacment being proportional to the distortion or wavefront slope of the input wavefront. The simplified wavefront sensor illustrated in FIGS. 1 and 2 indicates the wavefront slope only on the one axis along which the grating 18 is translated.

FIGS. 3 and 4 illustrate one embodiment of the present invention which senses the wavefront slope along two orthogonal axes, or the total slope of the two dimensional wavefront. In this embodiment the input optical system utilizes an anamorphic or cylindrical lens 32 in combination with a spherical objective lens 34. FIGS. 3 and 4 illustrate respectively plan and elevational views (from orthogonally displaced directions) of the same wavefront sensing system. In the plan view shown in FIG. 3 illustrating a section of a designated x axis, the cylindrical lens 32 functions as a positive lens and refracts the wavefront, in combination with the spherical lens 32, to an x focal plane at which a linearly oscillating reticle or grating 36 is positioned to modulate the wavefront along the x axis. The modulated wavefront then passes to a positive spherical lens 38 and negative cylindrical lens 40 which in combination collimates the beam along the x axis and directs it onto a two dimensional array of photodetectors 41. A silicon detector array incorporating preamplifiers therein, as are available from Silicon Detector Corporation, would be suitable for the practice of the present invention. Accordingly, similar in concept to the embodiment of FIGS. 1 and 2, the detectors in the array are responsive to different portions of the wavefront and produce output signals which are displaced in time in proportion to the wavefront slope along the x axis.

FIG. 4 is an elevational view of the same system along the designated y axis, and illustrates that along this axis the anamorphic cylindrical lenses 32 and 40 are basically plane optical elements having no refractive powers. Accordingly, along the y axis only the spherical lens 34 focuses the wavefront to a y focal plane, displaced a distance along the optical axis 42 of the system from the x focal plane. A linearly oscillating reticle or grating 43 positioned in the y focal plane modulates the wavefront along the y axis. The modulated wavefront then passes to positive spherical lens 38 which collimates the beam along the y axis and directs it onto the two dimensional array of photodetectors 41. Accordingly, the detectors in the array are responsive to different portions of the wavefront and produce output signals which are displaced in time in proportion to the wavefront slope along the y axis.

The x and y modulation reticles 36 and 43 are essentially gratings having a series of light transmissive and light opaque lines arranged in a square wave pattern, as shown in FIG. 5. Each reticle consists of two or more cycles of a square wave intensity function, with a cycle being defined as a transmitting line and an opaque line. The areas of the transmitting and opaque parts of the reticle are fixed and invariate during each oscillation period, and for that reason the wavefront sensor will operate with extended reference surfaces, such as the surface of the sun. The main requirement is that the scale of the brightness variations in the reference source image (such as solar granulation) is comparable with the size of the transmitting or opaque areas in the reticle.

Each of the reticles 36 and 43 is linearly oscillated in its focal plane by respective electrically driven actuators 44 and 46, such as tuning forks or torsional vibrators. The reticles 36 and 43 can be optically formed on an extremely light film substrate, and can be mounted on an electrically driven tuning fork, such as are available from American Time Products, to linearly oscillate therewith. Tests on this arrangement have indicated that the addition of a film substrate to the vibrating element of a tuning fork has little apparent effect on its operation. Oscillation frequencies of up to three kilohertz are possible using commercially available tuning forks.

A field stop element 50 with an aperture having dimensions exactly equal to one grating cycle of the reticles is centered on the optical axis between the gratings 36 and 43 to limit the field of view of the optical system. In operation, grating 36 is oscillated at a frequency $f_x$ and grating 43 is oscillated at a different frequency $f_y$, which allows the output signal of each detector to be filtered through separate electrical filters at the frequencies $f_x$ and $f_y$ to separate the modulated information on the wavefront slope along the x and y axes. For instance, one of the frequencies could be chosen to match the operational frequency of a commercially available electrically driven tuning fork, generally available up to 3 kilohertz, and the second frequency could be separated therefrom by several hundred hertz.

When the wavefront is produced by a uniformly illuminated source, each reticle or grating transmits 50% of the incident light within the field stop at any position in the cycle, which results in an overall transmission of 25% by both reticles in series. Under these conditions, there is no intensity modulation of the light at the detector plane. However if the intensity of the reference source image with the field stop is not uniform, for example due to surface granulation of the sun in a solar observation optical system, then the light reaching each detector is modulated in intensity as a function of time at the frequency of the reticle oscillation. For a plane wavefront, the intensity modulation is substantially the same, as a function of time, at all of the detector zones. However if the wavefront is deformed, the image produced at the reticle in each detector zone is displaced by the local wavefront slope so that the intensity variations in each detector zone are displaced in time.

If the wavefront is randomly deformed such that the image in each detector zone remains within the field stop, the signals from all of the detectors can be combined to form an average signal $\bar{t}$ representing the average time displacement. The difference between this average signal $\bar{t}$ and each individual detector signal then represents the local slope of the wavefront with respect to the average. An approach of this nature substantially eliminates the effect of a varying reference source image within the field stop, and enables wavefront aberrations of second and higher orders to be measured.

A circuit for processing the detector signals is illustrated in FIG. 6, with the detailed processing of only one detector signal being illustrated for the sake of simplicity. In practice, every other detector signal would be processed in a similar manner. Referring to FIG. 6, the output signal from a photodetector 52 is directed to an amplifier 53. The detector array 41 is a two dimensional array, with only a portion of the photodetectors in the array being shown in FIG. 6. The amplified signal from photodetector 52 is directed through a y electrical filter 54 and an x electrical filter 56, tuned respectively to the frequencies $f_y$ and $f_x$. The filtered signals are then directed to averaging circuits 58 and 60 which respectively combine the y filtered signal with all other y filtered signals from all of the photodetectors in the array to obtain a y average signal $\bar{t}y$, and the x filtered signal with all other x filtered signals from all of the photodetectors in the array to obtain an x average signal $\bar{t}x$. The circuits 58 and 60 can be simply resistive or operational amplifier summing and averaging circuits, or equivalent circuits.

The amplified signal from photodetector 52 is then compared in x and y time displacement detector circuits 62 and 64 with respectively the x average signal $\bar{t}x$ and the y average signal $\bar{t}y$ and the results thereof directed through respectively an x low pass filter 66 and a y low pass filter 68 to derive signals representative of respectively the x local wavefront slope and the y local wavefront slope at photodetector 52. This approach substantially eliminates the effect of varying reference source image structure within the field stop, enabling wavefront aberrations of second and higher order to be measured. The only requirement on the reference source is that it should contain a spatial frequency component at the fundamental reticle frequency.

The first-order (overall tilt) component of the wavefront is measured by comparing respectively the time difference, in time detector circuits 70 and 72 between the average signals $\bar{t}x$ and $\bar{t}y$ and the signals driving the x and y reticles, from respectively x and y drive generators 74 and 76, which are representative of the fixed time reference generated by motions of the reticles and are not dependent upon the reference source intensity distribution. The output signals of the x and y time detector circuits 70 and 72 are then passed respectively to x and y low pass filters 78 and 80 to derive signals representative of respectively the x overall wavefront tilt and the y overall wavefront tilt.

The signals generated by the circuit in FIG. 6 can then be utilized in a real time wavefront correction system in a manner substantially as disclosed and taught in Hardy U.S. Pat. No. 3,923,400, which is expressly incorporated by reference herein.

While several embodiments and variations of the present invention for a wavefront sensor have been described in detail, it should be appreciated that the disclosure and teachings of the present invention as set forth herein will suggest yet other variations and embodiments to those skilled in this art. For instance, the photodetector arrays herein could be replaced with other types of sensors for detecting light in the different zones of the expanded wavefront, such as a CCD array or some other equivalent two-dimensional photodetector.

What is claimed is:

1. A relatively simple wavefront sensor, comprising:
   a. an astigmatic optical system for focusing an incident wavefront to x and y focal planes along on optical axis, with the x and y focal planes being displaced from each other along the optical axis because of the astigmatic nature of the optical systems;
   b. an x modulation reticle positioned at the x focal plane, and an x drive means for moving the x modulation reticle, substantially perpendicular to the optical axis, to modulate the wavefront at the x focal plane at a frequency $f_x$;
   c. a y modulation reticle positioned at the y focal plane, and a y drive means for moving the y modulation reticle, substantially perpendicular to both the optical axis and the direction of oscillation of the x modulation reticle, to modulate the wavefront at the y focal plane at a frequency $f_y$; and
   d. a two-dimensional detector means positioned substantially perpendicular to the optical axis to detect the wavefront at a two-dimensional array of zones after it has passed through the x and y focal planes and for producing an output signal for each zone indicative of the light detected in that zone such that the time relationships between the signals produced for the different zones are representative of the slope of the wavefront in the different zones.

2. A relatively simple wavefront sensor, as claimed in claim 1, said y drive means driving the y modulation reticle at a frequency $f_y$ which is different from said frequency $f_x$.

3. A relatively simple wavefront sensor, as claimed in claim 2, including an x electrical filter coupled to the output of each detector and tuned to said frequency $f_x$ to filter the modulated signal derived from modulation by said x modulation reticle, and a y electrical filter coupled to the output of each detector and tuned to said frequency $f_y$ to filter the modulated signal derived from modulation by said y modulation reticle.

4. A relatively simple wavefront sensor, as claimed in claim 1, wherein said two-dimensional detector means includes a photodetector array, with each photodetector in the array detecting light in a different zone of the wavefront.

5. A relatively simple wavefront sensor, as claimed in claim 1 or 2 or 3 or 4, said x modulation reticle and said y modulation reticle each including a series of light transmissive and light opaque reticle lines arranged in a square wave function.

6. A relatively simple wavefront sensor, as claimed in claim 1 or 2 or 3 or 4, said x drive means and said y drive means each including an electrically driven tuning fork.

7. A relatively simple wavefront sensor, as claimed in claim 1 or 2 or 3 or 4, including a field stop element positioned on the optical axis between said x modulation reticle and said y modulation reticle.

* * * * *